US005782333A

United States Patent [19]

Pitts

[11] Patent Number: 5,782,333
[45] Date of Patent: Jul. 21, 1998

[54] ESCALATOR HAVING HANDRAIL/DRIVE-WHEEL SELF-ADJUSTING TRACTION MECHANISM

[75] Inventor: John T. Pitts, Penang, Malaysia

[73] Assignee: Otis Elevator Company, Farmington, Conn.

[21] Appl. No.: 774,770

[22] Filed: Dec. 30, 1996

[51] Int. Cl.[6] .......... B65G 23/00
[52] U.S. Cl. .......... 198/336
[58] Field of Search .......... 198/330, 336

[56] References Cited

U.S. PATENT DOCUMENTS 3,651,919 3/1972 Vollmer .......... 198/336 X
5,544,730 8/1996 Adrian et al. .......... 198/336

FOREIGN PATENT DOCUMENTS 1313798 5/1987 U.S.S.R. .......... 198/336
1393745 5/1988 U.S.S.R. .......... 198/336
1557049 4/1990 U.S.S.R. .......... 198/336

*Primary Examiner*—James R. Bidwell

[57] ABSTRACT

The invention provides an escalator having a handrail arranged on a drive wheel and comprising a handrail drive means and a handrail/drive-wheel traction self-adjusting means. The handrail drive means responds to a handrail drive force, for providing a handrail drive tension force, and further responds to a handrail/drive-wheel traction self-adjusting force, further for providing a handrail/drive-wheel traction force between the drive wheel and the handrail. The handrail/drive-wheel traction self-adjusting means, responds to the handrail drive tension force, for providing the handrail/drive-wheel traction self-adjusting force to adjust the handrail/drive-wheel traction between the drive wheel and the handrail.

7 Claims, 3 Drawing Sheets

FIG. 1
PRIOR ART
FIG. 1A
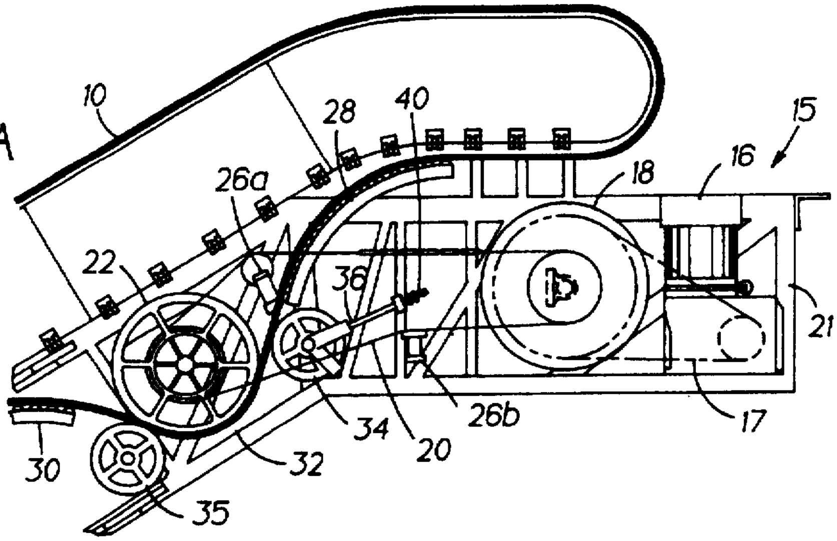
FIG. 1D
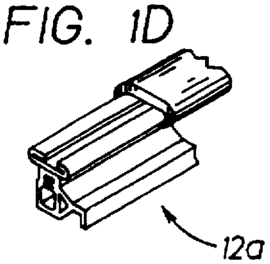
FIG. 1E
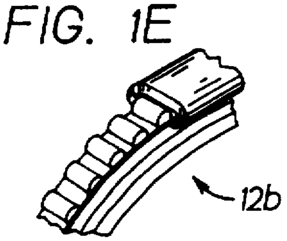
FIG. 1B
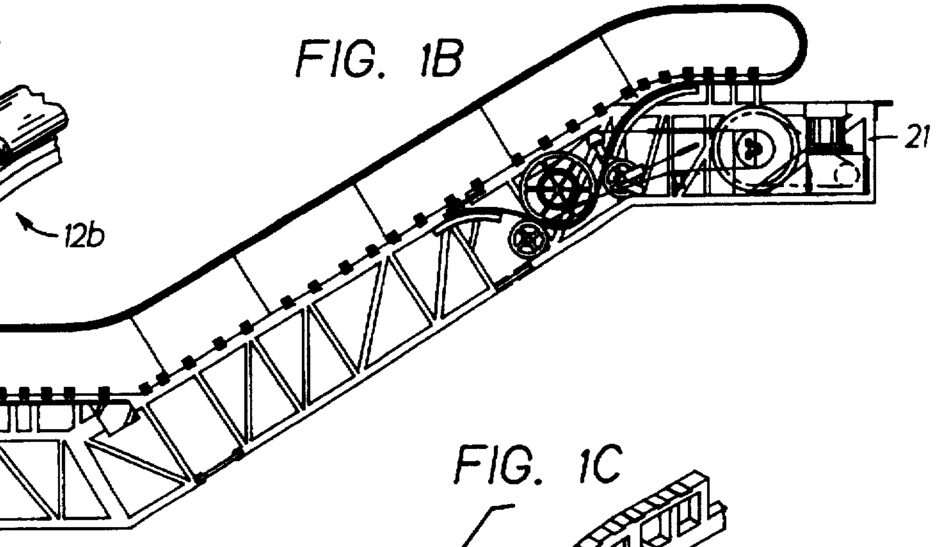
FIG. 1F
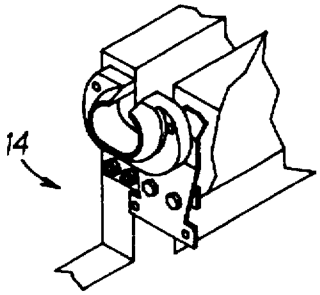
FIG. 1C
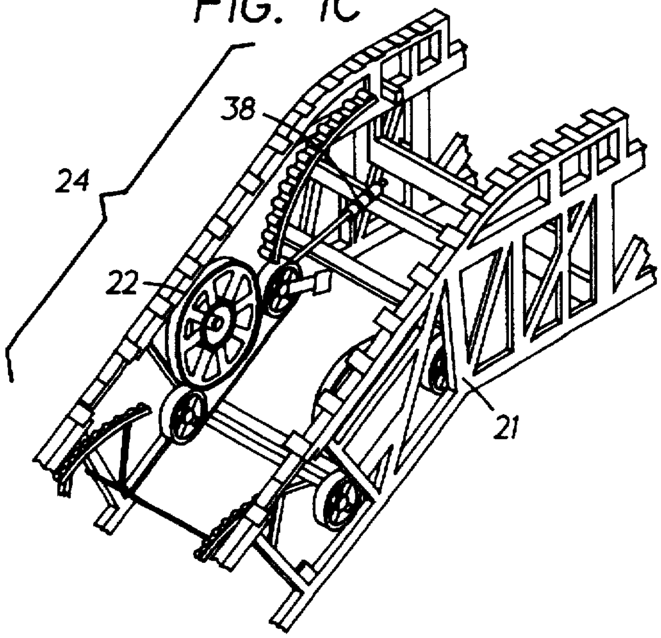

ESCALATOR HAVING HANDRAIL/DRIVE-WHEEL SELF-ADJUSTING TRACTION MECHANISM

TECHNICAL FIELD

This invention relates to an escalator, and more particularly, to an escalator having a handrail/drive-wheel traction mechanism.

BACKGROUND OF THE INVENTION

FIG. 1, including FIGS. 1A–1F, shows a typical escalator generally indicated as 5 having a handrail 10 that is made up of an underlayment of fabric plies covered with rubber and reinforced with steel cords. An inner fabric layer allows the handrail 10 to slide over a handrail guide such as 12*a*, 12*b* shown in FIGS. 1D, 1E and provides a good bonding surface for a real or synthetic rubber layer that is molded over it. Steel reenforcement, tape or wire is added to minimize stretching of the handrail 10. The handrail 10 is formed in a C-shaped cross section (FIGS. 1D, 1E) that fits over the handrail guide such as 12*a*, 12*b* shown in FIGS. 1D, 1E in a pinch-proof fashion. The handrail 10 enters and exits through a handrail entry device 14 (FIG. 1F).

A drive system generally indicated as 15 in FIG. 1A separately drives each handrail 10. The drive system 15 includes a machine 16, a main drive chain 17, a main drive gear 18, a drive chain 20, a handrail drive wheel 22, as well as a handrail/drive-wheel traction mechanism generally indicated as 24, all mounted on an escalator truss 21. The handrail/drive-wheel traction mechanism is also referred to as a handrail drive traction in FIG. 1C. As shown in FIGS. 1A and 1C, the handrail 10 passes between the handrail drive wheel 22 and the handrail/drive-wheel traction mechanism 24. Since the handrail drive wheel 22 is turned by the drive chain 20, the handrail 10 moves at the same speed as the escalator steps (not shown). Two chain tensioners 26*a*, 26*b* (FIG. 1A) keep the handrail-drive chain 20 tight, while roller bows 28, 30 (see FIG. 1A) act to take up any slack in the handrail 10.

The handrail/drive-wheel traction mechanism 24 forces the handrail 10 against the drive wheel 22 providing the necessary traction. The handrail/drive-wheel traction mechanism 24 has a handrail/drive-wheel traction belt 32, also known as a pressure belt, mounted on a pivotal pressure belt wheel 34. The handrail/drive-wheel traction belt 32 provides tension to prevent the handrail 10 from slipping. As shown in FIG. 1A, the handrail/drive-wheel traction mechanism 24 includes a rod 36 connected to the pivotal pressure belt wheel 34, a pressure belt spring 38, and an adjustment screw 40. The tension of the handrail/drive-wheel traction belt 32 is controlled by a belt tension spring 38 (FIGS. 1A, 1C). The handrail/drive-wheel traction mechanism 18 is manually adjustable by tightening and loosening the adjustment screw 40.

The handrail/drive-wheel traction belt 32 of handrail drive systems has long been a source of problems because it wears out too often and requires precise adjustment to obtain maximum useful life.

Adjustment of the handrail/drive-wheel traction belt is critical because an under-tensioned belt will result in erratic handrail movement. An over-tensioned pressure belt will result in premature wear of the belt and possible handrail drive failure. Both of these conditions are concerns in the industry.

DISCLOSURE OF INVENTION

In its broadest sense, the present invention provides an escalator having a handrail arranged on a drive wheel and comprising a handrail drive means and a handrail/drive-wheel traction self-adjusting means.

The handrail drive means responds to a handrail drive force, for providing a handrail drive tension force, and further responds to a handrail/drive-wheel traction self-adjusting force, further for providing a handrail/drive-wheel traction force between the drive wheel and the handrail.

The handrail/drive-wheel self-adjusting traction means, responds to the handrail drive tension force, for providing the handrail/drive-wheel traction self-adjusting force to adjust the handrail/drive-wheel traction between the drive wheel and the handrail.

In particular, the basic design is comprised of a sliding, spring mounted, chain tensioner which is connected with a pushrod to a pressure belt tension adjustment arm. The pressure belt tension adjustment arm rotates to move a pressure belt sheave and change a belt tension. As a load is applied to the handrail, the drive chain tension increases forcing a chain tensioner and the pushrod against the pressure belt tension adjustment arm. This added force on the pressure belt tension adjustment arm causes the arm to rotate thereby increasing the pressure belt tension which increases the traction and drive force of the handrail. When the load is removed from the handrail, the pressure belt tension will automatically return to its minimum setting.

Some important features of the claimed invention are as follows: (1) The handrail drive belt tensioning mechanism automatically senses and compensates for loads on the handrail. (2) The handrail drive chain tensioner also acts as a load sensing device. (3) The pressure belt tensioning arm is linked to the drive chain tension on an escalator handrail drive system.

One important advantage of the claimed invention is that, with the pressure belt running most of the time at its minimum setting, the pressure belt life will be extended. Minimum settings for both chain tension and belt tension are maintained with springs.

Other important advantages of the claimed invention are that the escalator has less erratic handrail movement, has significantly less handrail/belt wear, and has significantly reduced overall handrail drive failures, all combined to result in a better escalator.

BRIEF DESCRIPTION OF THE DRAWING

For a fuller understanding of the nature and objects of the invention, reference should be made to the following detailed descriptions taken in connection with the accompanying drawings, not in scale, in which:

FIG. 1, including FIGS. 1A, 1B, 1C, 1D, 1E and 1F, shows an escalator generally indicated as 5 that is known in the art.

BEST MODE FOR CARRYING OUT THE INVENTION

Figure 2:
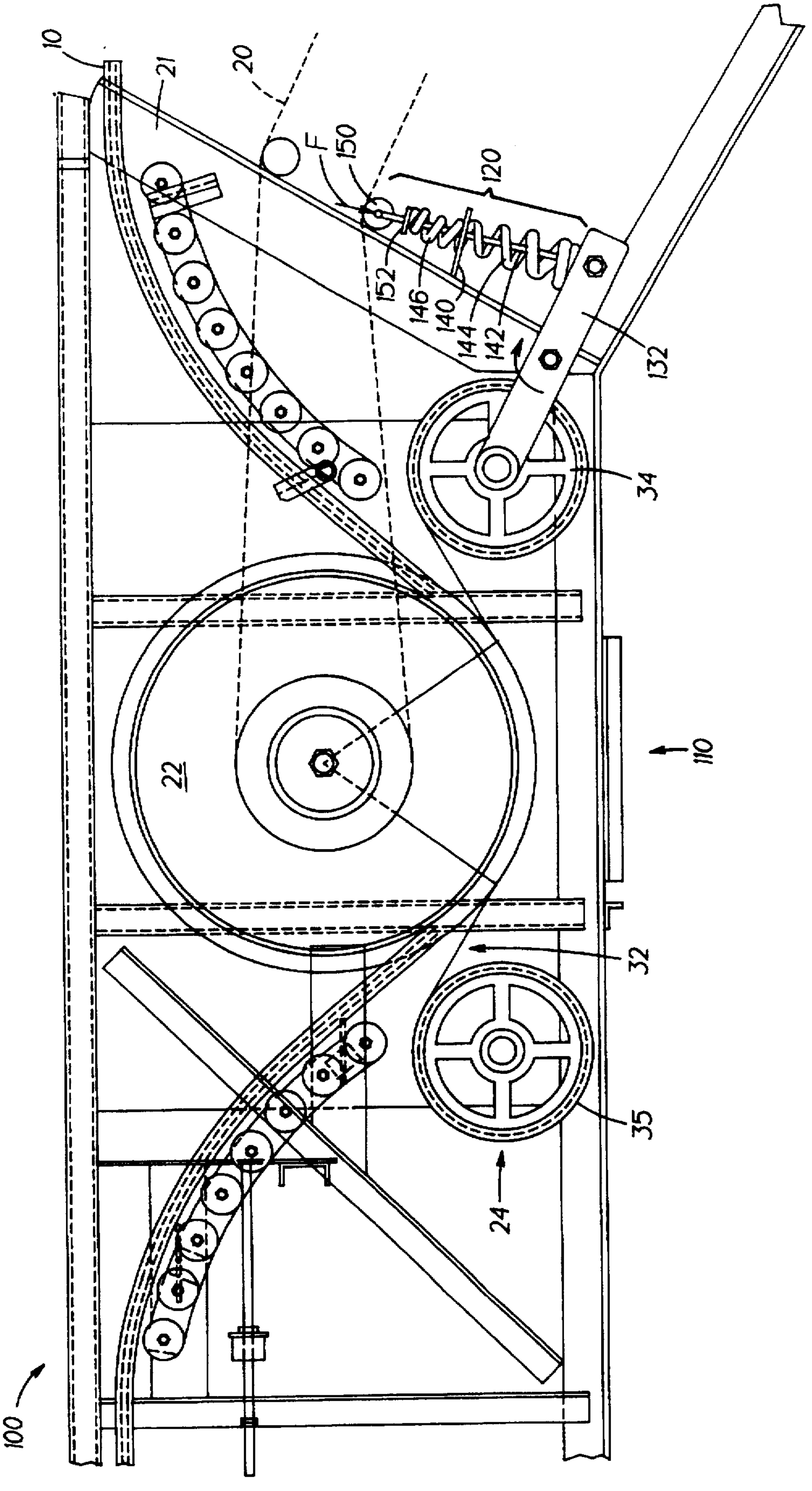
FIG. 2 shows a side partial view of one embodiment of an escalator generally indicated as 100 that is the subject matter of the claimed invention.

FIG. 2 shows a side partial view of an escalator generally indicated as 100 having a handrail drive means generally indicated as 110 and a handrail/drive-wheel traction self-adjusting means generally indicated as 120. For the purpose of describing the present invention, the parts of the handrail drive means 110 are labelled similarly to that shown and described with respect to FIG. 1 above. As shown in FIG. 2, the handrail drive means 110 includes the drive chain 20, the handrail drive wheel 22, and the handrail/drive-wheel traction mechanism 24.

The handrail drive means 110 responds to a handrail drive force, for providing a handrail drive tension force. The handrail drive force is applied by the main drive gear 18 as shown in FIG. 1A to the drive chain 20. The handrail drive tension force is labelled a chain tension force (F) in FIG. 2.

The handrail drive means 110 also responds to a handrail/drive-wheel traction self-adjusting force, for providing a handrail/drive-wheel traction force between the drive wheel 22 and the handrail 10. The handrail/drive-wheel traction force controls the traction between the drive wheel 22 and the handrail 10, and is applied by the handrail/drive-wheel self-adjusting traction means 120, as discussed immediately below.

In the present invention, the handrail/drive-wheel self-adjusting traction means 120 shown in FIG. 2 replaces the chain tensioner 26*b* shown in FIG. 1A, as well as the rod 36, the pressure belt spring 38, the adjustment screw 40 shown in FIG. 1C of the handrail/drive-wheel traction mechanism 24.

The handrail/drive-wheel self-adjusting traction means 120 responds to the handrail drive tension force (i.e. chain tension force (F)), for providing the handrail/drive-wheel traction self-adjusting force to adjust the handrail/drive-wheel traction between the drive wheel 22 and the handrail 10. As shown, the handrail/drive-wheel traction adjustment means 120 includes a pressure belt tension spring plate 140, a handrail/drive-wheel traction pushrod 142, a pressure belt tension spring 144, and a chain tension spring 146, a chain tensioner wheel 150, and a chain tension spring plate 152. The pressure belt tension spring plate 140 is fixedly connected to the escalator truss 21, and is used to guide the handrail/drive-wheel traction pushrod 142 and to seat the pressure belt tension spring 144 and the chain tension spring 146.

The handrail/drive-wheel traction pushrod 142 passes through the pressure belt tension spring plate 140, having one end connected to a pivotally mounted pressure belt tension adjustment arm 132 connected to the pivotal pressure belt wheel 34, having another end with the chain tensioner wheel 150 coupled to the drive chain 20 of the handrail drive means 110, and having the chain tension spring plate 152 fixedly connected thereto. In contrast to that described above with respect to FIG. 1, in the present invention the pivotal pressure belt wheel 34 also includes the pivotally mounted pressure belt tension adjustment arm 132, which is considered a part of the handrail/drive-wheel self-adjusting traction means 120.

The pressure belt tension spring 144 is arranged on the handrail/drive-wheel traction pushrod 142 between the pivotally mounted pressure belt tension adjustment arm 132 and the pressure belt tension spring plate 140, for providing a pressure belt tension spring force on the pivotally mounted pressure belt tension adjustment arm 132.

The chain tension spring 146 is arranged on the handrail/drive-wheel traction pushrod 142 between the pressure belt tension spring plate 140 and the chain tension spring plate 152, is responsive to the handrail drive tension force, for providing a chain tension spring force as the handrail/drive-wheel traction self-adjusting force to adjust the handrail/drive-wheel traction between the drive wheel 22 and the handrail 10.

In operation, the handrail/drive-wheel traction self-adjusting means 120 responds to an increased handrail drive tension force applied by the drive chain 20, and provides an increased handrail/drive-wheel traction self-adjusting force to adjust the handrail/drive-wheel traction between the drive wheel 22 and the handrail 10. Alternatively, the handrail/drive-wheel traction adjustment means 120 responds to a decreased handrail drive tension force applied by the drive chain 20, and provides a decreased handrail/drive-wheel traction self-adjusting force to adjust the handrail/drive-wheel traction between the drive wheel 22 and the handrail 10.

In effect, the handrail/drive-wheel traction self-adjusting means 120 will automatically adjust the tension on the pressure belt 32 as needed to drive the handrail 10 with constant velocity under all loading conditions. The handrail/drive-wheel traction self-adjusting means 120 allows the pressure belt 32 to operate at minimum tension when minimum drive force is needed to be applied on the handrail 10. However, when a load is applied to the handrail 10, the handrail/drive-wheel traction self-adjusting means 120 will automatically compensate for the load by increasing the tension applied on pressure belt 32 thereby increasing the handrail drive force of the handrail drive means 110. The automatic adjustment is accomplished by linking the tension chain tension to the pressure belt tension.

Figure 3:
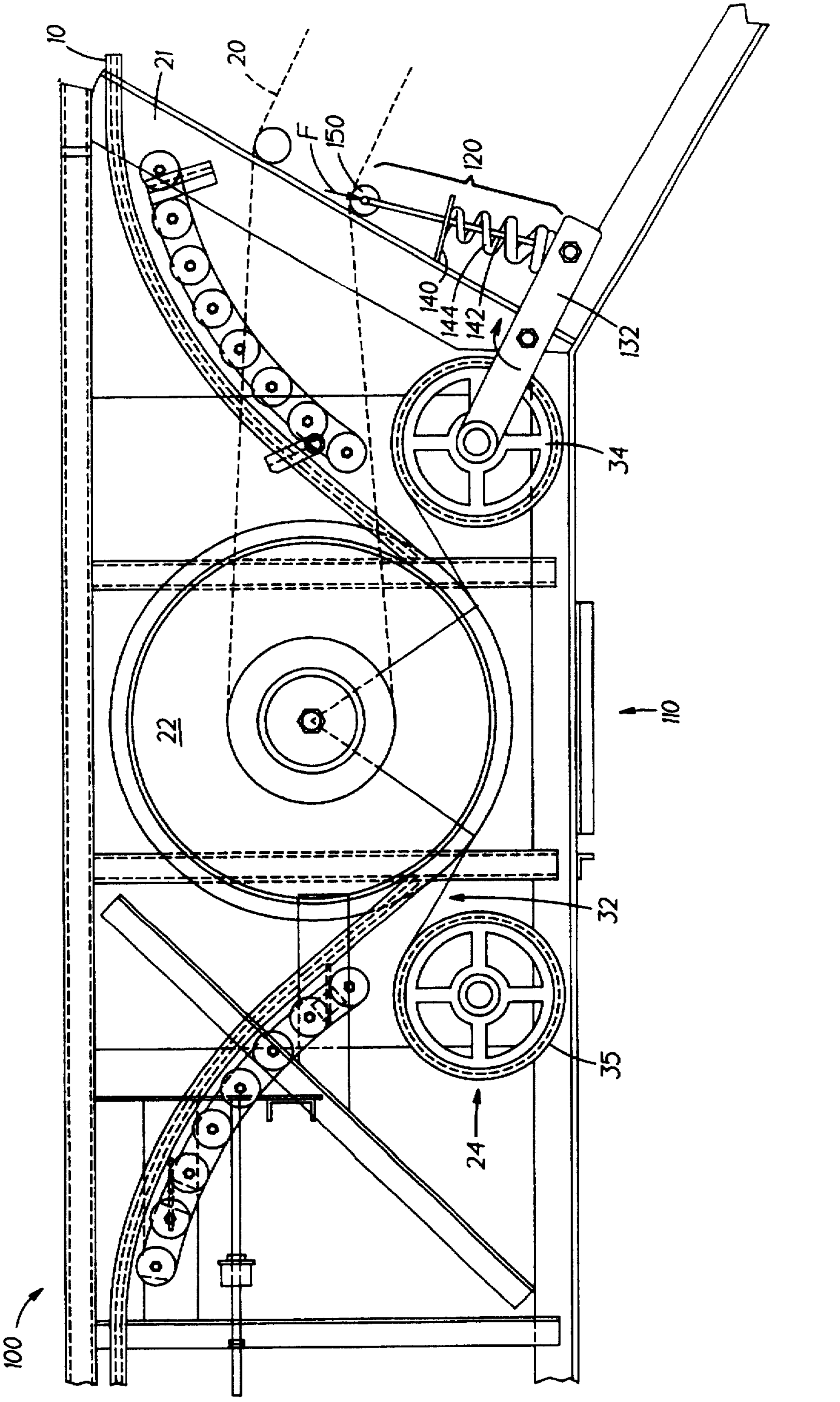
FIG. 3 shows a side partial view of an alternative embodiment of an escalator generally indicated as 100 that is the subject matter of the claimed invention.

FIG. 3 shows an alternative design with a slight modification that simplifies the embodiment shown in FIG. 2. In FIGS. 2 and 3, similar parts are identified with the same reference numerals for the sake of consistency for the reader. In FIG. 3, the alternative design takes advantage of the fact that by using a properly sized pressure belt tension spring 144, there would be no need for the chain tension spring 146. The force required to tension the handrail drive chain 20 would be provided by the pressure belt tension adjustment arm 132. In effect, the force from the pressure belt tension adjustment arm 132 would be balanced by two opposing forces: One force is from the chain tension force F and another force is from the pressure belt tension spring 144. The pressure belt tension spring 144 would be properly sized to have a spring rate which would allow any increase in the chain tension force F to be transmitted directly to the pressure belt tension adjustment arm 132—causing the pressure belt tension adjustment arm 132 to rotate and increase the tension on the pressure belt 32.

As a practical matter, a spring force adjustment collar 150 is added to the pressure belt tension spring plate 140 to allow for proper initial adjustment of spring force of the pressure belt tension spring 144 and belt tension.

The main principle of the escalator in FIG. 3 is effectively the same as the embodiment shown in FIG. 2 described above, i.e. any increased handrail load will increase the drive chain tension which will automatically increase the pressure belt tension and increase the available traction of the handrail. This will prevent the handrail from slipping under increased load—without running the handrail drive at constantly high settings.

Although the present invention has been described and discussed herein with respect to one or more embodiments, other arrangements or configurations are possible which do not depart from the spirit and scope hereof. Hence, the present invention is deemed limited only by the appended claims and the reasonable interpretation thereof.

I claim:

1. An escalator having a handrail arranged on a drive wheel, comprising:

handrail drive means, responsive to a handrail drive force, for providing a handrail drive tension force, and further responsive to a handrail/drive-wheel traction self-adjusting force, further for providing a handrail/drive-wheel traction force between the drive wheel and the handrail; and handrail/drive-wheel traction self-adjusting means, responsive to the handrail drive tension force, for providing the handrail/drive-wheel traction self-adjusting force to adjust the handrail/drive-wheel traction between the drive wheel and the handrail, wherein the handrail/drive-wheel traction adjustment means comprises:

a handrail/drive-wheel traction pushrod being slidably arranged in a fixedly mounted pressure belt tension spring plate, having one end connected to a pivotally mounted pressure belt tension adjustment arm, having another end with a chain tension wheel coupled to a drive chain of the handrail drive means; and a pressure belt tension spring arranged on the handrail/drive-wheel traction pushrod between the pivotally mounted pressure belt tension adjustment arm and the pressure belt tension spring plate, for providing a pressure belt tension spring force on the pivotally mounted pressure belt tension adjustment arm of the handrail drive means.

2. An escalator according to claim 1, wherein the handrail/drive-wheel traction pushrod has a chain tension spring plate fixedly connected thereto, and wherein the handrail/drive-wheel traction adjustment means further comprises:

a chain tension spring arranged on the handrail/drive-wheel traction pushrod between the pressure belt tension spring plate and the chain tension spring plate, responsive to the handrail drive tension force, for providing a chain tension spring force as the handrail/drive-wheel traction self-adjusting force to adjust the handrail/drive-wheel traction between the drive wheel and the handrail.

3. An escalator according to claim 1, wherein the handrail drive means further comprises:

a pressure belt tension means having a first pressure belt wheel, having a second pressure belt wheel, and having a pressure belt arranged thereon for providing the handrail/drive-wheel traction force between the drive wheel and the handrail.

4. An escalator according to claim 1, wherein the pivotally mounted pressure belt tension adjustment arm has a pressure belt wheel rotatably mounted thereon.

5. An escalator according to claim 1, wherein the handrail/drive-wheel traction self-adjusting means is further responsive to an increased handrail drive tension force, for providing an increased handrail/drive-wheel traction self-adjusting force to adjust the handrail/drive-wheel traction between the drive wheel and the handrail; and wherein the handrail/drive-wheel traction adjustment means is further responsive to a decreased handrail drive tension force, for providing a decreased handrail/drive-wheel traction self-adjusting force to adjust the handrail/drive-wheel traction between the drive wheel and the handrail.

6. An escalator according to claim 1, wherein the pressure belt tension spring plate is fixedly connected to an escalator truss; and wherein the pivotally mounted pressure belt tension adjustment arm is mounted on the escalator truss.

7. An escalator according to claim 1, wherein the pressure belt tension spring plate is fixedly connected to an escalator truss; and wherein the pivotally mounted pressure belt tension adjustment arm is mounted on the escalator truss.

* * * * *